(12) United States Patent
Sulser et al.

(10) Patent No.: US 8,366,149 B2
(45) Date of Patent: Feb. 5, 2013

(54) STEERING COLUMN FOR A MOTOR VEHICLE

(75) Inventors: Hansjörg Sulser, Gamprin (LI); Sebastian Huber, Götzis (AT)

(73) Assignee: Thyssenkrup Presta Aktiengesellschaft, Eschen (LI)

( * ) Notice: Subject to any disclaimer, the term of this patent is extended or adjusted under 35 U.S.C. 154(b) by 0 days.

(21) Appl. No.: 13/055,526

(22) PCT Filed: Jul. 6, 2009

(86) PCT No.: PCT/AT2009/000264
§ 371 (c)(1),
(2), (4) Date: Jan. 24, 2011

(87) PCT Pub. No.: WO2010/009486
PCT Pub. Date: Jan. 28, 2010

(65) Prior Publication Data
US 2011/0115206 A1    May 19, 2011

(30) Foreign Application Priority Data

Jul. 24, 2008   (DE) .......................... 10 2008 034 807

(51) Int. Cl.
*B62D 1/18* (2006.01)
(52) U.S. Cl. ........................... 280/775; 74/493; 280/777
(58) Field of Classification Search ................... 74/492, 74/493; 280/775, 777; 188/371, 374
See application file for complete search history.

(56) References Cited

U.S. PATENT DOCUMENTS
5,082,311 A    1/1992   Melotik
(Continued)

FOREIGN PATENT DOCUMENTS
DE   28 21 707   11/1978
DE   41 38 239   5/1993
(Continued)

OTHER PUBLICATIONS

"Strip" Definition, Merriam-Webster Online Dictionary, available at http://www.merriam-webster.com/dictionary/strip (last visited Apr. 30, 2012).*

(Continued)

*Primary Examiner* — Joseph Rocca
(74) *Attorney, Agent, or Firm* — Wenderoth, Lind & Ponack, L.L.P.

(57) ABSTRACT

A steering column for a motor vehicle, which can be adjusted at least in the longitudinal direction thereof, comprises a carrying unit fixed to the chassis, an adjusting unit that rotatably supports the steering spindle, and a tensioning mechanism, in the open state of which the steering column can be adjusted and in the closed state of which the set position is fixed and which comprises at least one locking part (16), which in the closed state of the tensioning mechanism is tensioned with an engagement part, wherein the adjusting unit is connected to the engagement part such that it is held non-displaceably in the longitudinal direction of the steering column relative to the engagement part during normal operation, and can be displaced in the longitudinal direction of the steering column relative to the engagement part while absorbing energy in the event of a crash. The engagement part interacts with at least one bending wire or strip, of which at least one section is carried along by the adjusting unit during the displacement of the adjusting unit relative to the engagement part, wherein the bending wire or strip deforms during the displacement of the adjusting unit relative to the engagement part.

16 Claims, 6 Drawing Sheets

U.S. PATENT DOCUMENTS

| | | | |
|---|---|---|---|
| 5,286,056 A | 2/1994 | Speich | |
| 5,517,877 A | 5/1996 | Hancock | |
| 5,562,307 A * | 10/1996 | Connor | 280/777 |
| 5,722,299 A | 3/1998 | Yamamoto et al. | |
| 5,820,163 A * | 10/1998 | Thacker et al. | 280/775 |
| 5,961,146 A | 10/1999 | Matsumoto et al. | |
| 5,988,679 A | 11/1999 | Schelling et al. | |
| 6,095,012 A | 8/2000 | Lutz | |
| 6,264,240 B1 | 7/2001 | Hancock | |
| 6,419,269 B1 | 7/2002 | Manwaring et al. | |
| 6,616,185 B2 | 9/2003 | Manwaring et al. | |
| 6,792,824 B2 * | 9/2004 | Jolley et al. | 74/493 |
| 6,848,716 B2 | 2/2005 | Lutz | |
| 7,350,815 B2 * | 4/2008 | Spano et al. | 280/775 |
| 7,484,430 B2 | 2/2009 | Schulz | |
| 7,607,696 B2 | 10/2009 | Graf | |
| 7,963,561 B2 * | 6/2011 | Waibel et al. | 280/777 |
| 8,047,096 B2 * | 11/2011 | Ridgway et al. | 74/493 |
| 2003/0057694 A1 | 3/2003 | Manwaring et al. | |
| 2004/0012185 A1 | 1/2004 | Lutz | |
| 2004/0155448 A1 | 8/2004 | Klukowski et al. | |
| 2006/0207379 A1 | 9/2006 | Riefe et al. | |
| 2006/0273568 A1 | 12/2006 | Manwaring et al. | |
| 2008/0217901 A1 | 9/2008 | Olgren et al. | |
| 2008/0229867 A1 | 9/2008 | Waibel et al. | |
| 2009/0013817 A1 * | 1/2009 | Schnitzer et al. | 74/493 |
| 2012/0024101 A1 * | 2/2012 | Schnitzer et al. | 74/492 |

FOREIGN PATENT DOCUMENTS

| | | |
|---|---|---|
| DE | 693 04 659 | 3/1997 |
| DE | 10 2005 052 123 | 1/2007 |
| DE | 20 2008 015 444 | 3/2009 |
| DE | 10 2008 016 742 | 11/2009 |
| EP | 0 641 705 | 3/1995 |
| EP | 0 598 857 | 9/1996 |
| EP | 0 802 104 | 10/1997 |
| EP | 0 836 981 | 4/1998 |
| EP | 0 849 141 | 6/1998 |
| EP | 1 093 990 | 4/2001 |
| EP | 1 125 820 | 8/2001 |
| EP | 1 382 509 | 1/2004 |
| EP | 1 433 687 | 6/2004 |
| EP | 1 464 560 | 10/2004 |
| EP | 1 705 098 | 9/2006 |
| EP | 1 967 442 | 9/2008 |
| EP | 2 296 956 | 3/2011 |
| FR | 2 872 474 | 1/2006 |
| FR | 2 881 707 | 8/2006 |
| FR | 2 932 143 | 12/2009 |
| GB | 2 268 125 | 1/1994 |
| GB | 2 309 204 | 7/1997 |
| GB | 2 344 078 | 5/2000 |
| WO | 2007/048153 | 5/2007 |
| WO | 2009/121386 | 10/2009 |
| WO | 2009/147325 | 10/2009 |

OTHER PUBLICATIONS

"Deform" Definition, Merriam-Webster Online Dictionary, available at http://www.merriam-webster.com/dictionary/deform (last visited Apr. 30, 2012).*

"Shank" Definition, Merriam-Webster Online Dictionary, available at http://www.merriam-webster.com/dictionary/shank (last visited Apr. 30, 2012).*

"Cooperate" Definition, Merriam-Webster Online Dictionary, available at http://www.merriam-webster.com/dictionary/cooperate (last visited May 1, 2012).*

International Search Report issued Mar. 18, 2010 in International (PCT) Application No. PCT/AT2009/000264.

* cited by examiner

STEERING COLUMN FOR A MOTOR VEHICLE

BACKGROUND OF THE INVENTION

The invention relates to a steering column for a motor vehicle, which is at least adjustable in its longitudinal direction. The steering column comprises a support unit connectable with the chassis of the motor vehicle, a setting unit rotatably bearing supporting a steering spindle, and a clamping mechanism. In the opened state of the clamping mechanism, the setting unit is at least displaceable with respect to the support unit in the longitudinal direction of the steering column and, in the closed state of the clamping mechanism, the set position of the setting unit in normal operation is secured in position with respect to the support unit. The clamping mechanism comprises at least one arresting part which, in the closed state of the clamping mechanism, is tightened together with an engagement element and, in the opened state of the clamping mechanism, is spaced apart from the engagement element. The setting unit is connected with the engagement element so that the setting unit in normal operation is held nondisplaceably in the longitudinal direction of the steering column with respect to the engagement element, and in the event of a crash is dislocatable in the longitudinal direction of the steering column with respect to the engagement element with the absorption of energy.

Steering columns which are adjustable for the adaptation of the position of the steering wheel to the seating position of the driver are known in various embodiments. Apart from adjustable steering columns which are only adjustable in length or height and inclination direction, respectively, steering columns are known which are adjustable in length as well as also in height and inclination.

As a safety measure in the event of a vehicle crash, it is known to realize the steering column in a section adjoining the steering wheel-side end such that it is displaceable in the longitudinal direction of the steering column with the absorption of energy. A conventional form of implementation provides for this purpose that the support unit, with respect to which the setting unit in the opened state of the clamping mechanism, which unit rotatably supports the steering spindle, is adjustable for setting the position of the steering column, is connected with a chassis part applied on the vehicle chassis such that it is displaceable with respect to the chassis part under the consumption of energy. Such a design is disclosed, for example, in U.S. Pat. No. 5,517,877 A.

DE 28 21 707 A1 discloses a non-generic, since not adjustable, steering column, in which the jacket tube rotatably bearing the steering spindle includes bilaterally projecting lobes, which lobes are connected by means of securement blocks and bolts penetrating therethrough on the chassis. In the event of a crash, the lobes can become detached from the securement blocks whereby a dislocation of the jacket tube becomes possible. Herein, between the securement blocks and the lobes, U-shaped bending strips are provided on which, during the dislocation of the jacket tube, deformation work is carried out. The bending strips are herein enclosed in chambers of the lobes and are in contact on opposing side walls of the chamber such that the rolling radius of the particular bending strip is limited and predetermined in its deformation.

An adjustable steering column comprising a setting unit rotatably supporting the steering spindle and a support unit, with respect to which the setting unit, in the opened state of a clamping mechanism, for setting the position of the steering columns is at least adjustable in the longitudinal direction of the steering column, is disclosed in EP 0 598 857 B1. In the event of a crash, the setting unit can become dislocated in the longitudinal direction of the steering column with respect to the support unit or a clamp bolt of the clamping mechanism. For the energy absorption bending strips or bending wires are provided entrained by the setting unit and placed about the clamp bolt, which are deformed. A disadvantage of this solution is that the possible dislocation path or the characteristic of the energy absorption in the case of this device depends on the particular set length of the steering column.

U.S. Pat. No. 5,961,146 A, further, discloses a non-generic steering column adjustable only in the height direction in normal operation. Similarly to the manner previously described, about the clamp bolt of the clamping mechanism is provided a U-shaped curved bending wire, which, in the event of a crash, is entrained by the setting unit becoming dislocated with respect to the clamp bolt in the longitudinal direction of the steering column, wherein bending work is performed.

A steering column of the type described in the introduction is disclosed in WO 2007/048153 A2. In the closed state of the clamping mechanism, the engagement element is prevented by the arresting part of the clamping mechanism from becoming displaced with respect to this arresting part. The setting unit can become displaced with the absorption of energy with respect to the engagement element in the longitudinal direction of the steering column. For the absorption of energy, a bolt is disposed on the engagement element, which bolt projects into an elongated hole of an energy absorption part disposed on the setting unit, and during its dislocation in the event of a crash widens this elongated hole. To attain a defined energy absorption, the material properties of the energy absorption part must, in reproducible manner, be precisely fixed in the proximity of the elongated hole.

Similar steering columns are also disclosed in EP 0 849 141 A1 and EP 1 464 560 A2. The engagement elements are guided such that they are displaceable in the manner of a carriage by guidance parts in the longitudinal direction of the steering column, wherein they are retained under friction closure with respect to the guidance parts or deform these parts with the consumption of energy. In the case of a friction-closure retention, the clamping force of the clamping mechanism enters into the extent of the energy absorption and with a plastic deformation of the guidance parts, their material properties must be realized such that it is reproducible in a precisely defined manner.

SUMMARY OF THE INVENTION

The invention addresses the problem of providing an adjustable steering column of the type described in the introduction in which a highly reproducible energy absorption predeterminable in its characteristic is attainable, wherein the installation space for the energy absorption is as small as possible. This is attained according to the invention by a steering column with the features of the present invention.

In the steering column according to the invention, the engagement element cooperates with at least one bending wire or strip and, in the event of a crash, deforms the bending wire or strip if the setting unit is dislocated with respect to the engagement element. The engagement element is herein retained through the tightening together with the arresting part such that it is nondisplaceable with respect to the arresting part, which, in turn, is nondisplaceable in the longitudinal direction of the steering column with respect to the support unit. At least one section of the bending wire or strip is entrained by the setting unit in the dislocation of the setting unit in the longitudinal direction of the steering column. The deformation of the bending wire or strip takes place by bending the bending wire or strip or comprises at least one such bend. Herein, a relatively precisely defined energy absorption can be attained. The progression of the energy absorption over the displacement path is, for example, progressively settable with simple means. Such a bending wire or strip is a cost-effective element.

In a steering column according to the invention, the possible dislocation path traversed in the event of a motor vehicle crash with the absorption of energy can advantageously be independent of the set position of the steering column. Since the arresting part, referring to the longitudinal direction of the steering column or steering spindle, is nondisplaceable with respect to the support unit and the engagement element in the displacement of the setting unit with respect to the support unit in the opened state of the clamping mechanism moves simultaneously with the setting unit, the arresting part and the engagement element, with different longitudinal settings of the steering column in different settings, come into mutual contact if the clamping mechanism is closed. With the tightening together of the arresting part with the engagement element in the closed state of the clamping mechanism, there is counteraction against the displacement of the engagement element with respect to the arresting part through arresting elements, advantageously through cooperating toothings, preferably cooperating under form closure. The securement of the steering column in the closed state of the clamping mechanism with respect to a longitudinal adjustment consequently takes place at least also via the cooperation of the arresting part with the engagement element. Additional securement elements, acting, for example, under frictional closure, for the securement of the steering column with respect to a longitudinal adjustment in the closed state of the clamping mechanism can be provided.

The bending wire or strip advantageously comprises two shanks, connected across a recurvature, one of which is fixed on the engagement element and the other is entrained by the setting unit or a part fixed thereon if the setting unit is dislocated with respect to the support unit in the event of a crash. The other shank can herein, be, for example, in contact on a fixed stop opposite the setting unit. The two shanks of the bending wire or strip are connected with one another in particular via a recurvature of 150° to 220°, preferably 180°, such that a U-shaped realization of the bending wire or strip results. In an advantageous embodiment of the invention, the bending wire or strip is herein at least partially enclosed in a housing which, advantageously, is nondisplaceable with respect to the setting unit in the longitudinal direction of the steering column. The housing can be a single-part or a multi-part housing. Depending on the technical conditions, it can also be advantageous for the housing or parts of the housing to be fixed on the support unit. In one feasible embodiment, all of the walls of this housing can be formed by the jacket tube rotatably supporting the steering spindle. It is, however, preferred if on the jacket tube of the setting unit at least one part is attached which forms at least one wall of the housing. It is herein conceivable and feasible for all of the walls of the housing to be formed by at least one part attached on the jacket tube or for at least one wall to be formed by the jacket tube itself. This part attached on the jacket tube, which part forms at least one wall of the housing receiving the bending wire or strip, can be a rail which displaceably guides the engagement element in the longitudinal direction of the steering column with respect to the setting unit.

The bending wire or strip is preferably connected with the engagement element via an entrainer which projects through a slot in a wall of the housing, which slot extends in the longitudinal direction of the steering column.

BRIEF DESCRIPTION OF THE DRAWINGS

Further advantages and details of the invention are explained in the following section in conjunction with the attached drawings. In the drawings.

DETAILED DESCRIPTION OF THE INVENTION

Figure 1:
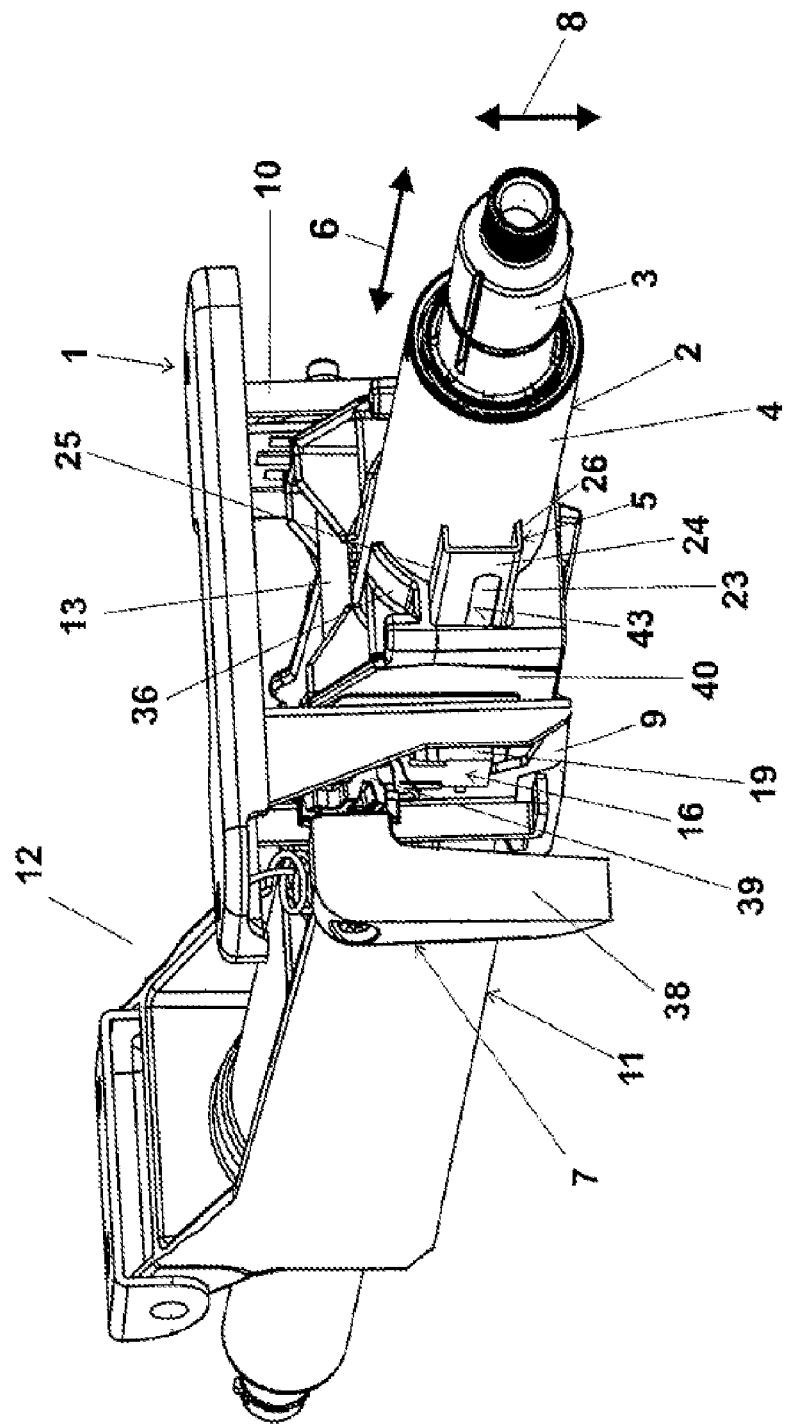
FIG. 1 is an oblique view of a steering column according to the invention.
Figure 2:
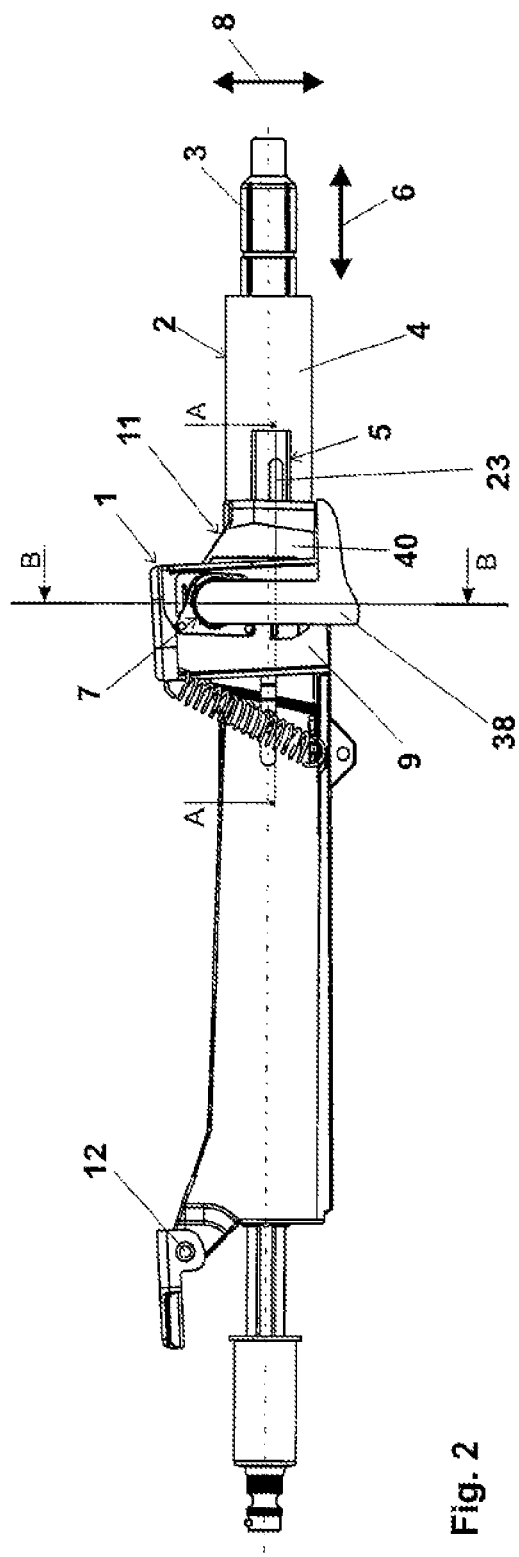
FIG. 2 shows the steering column of FIG. 1 in side view.
Figure 3:
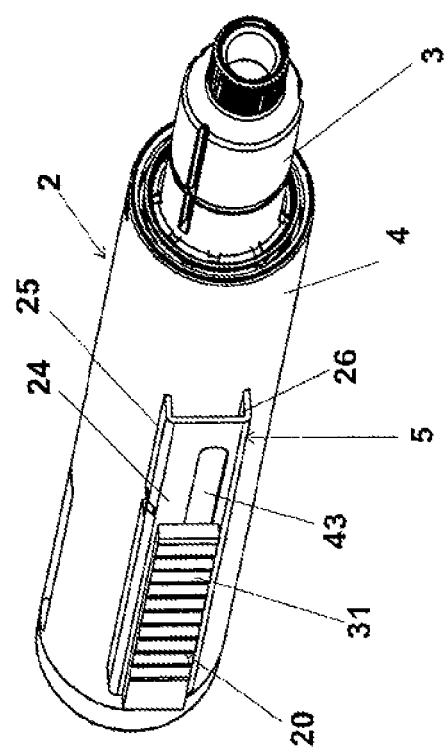
FIG. 3 is an oblique view of the setting unit with the section of the steering spindle rotatably supported by the setting unit.
Figure 4:
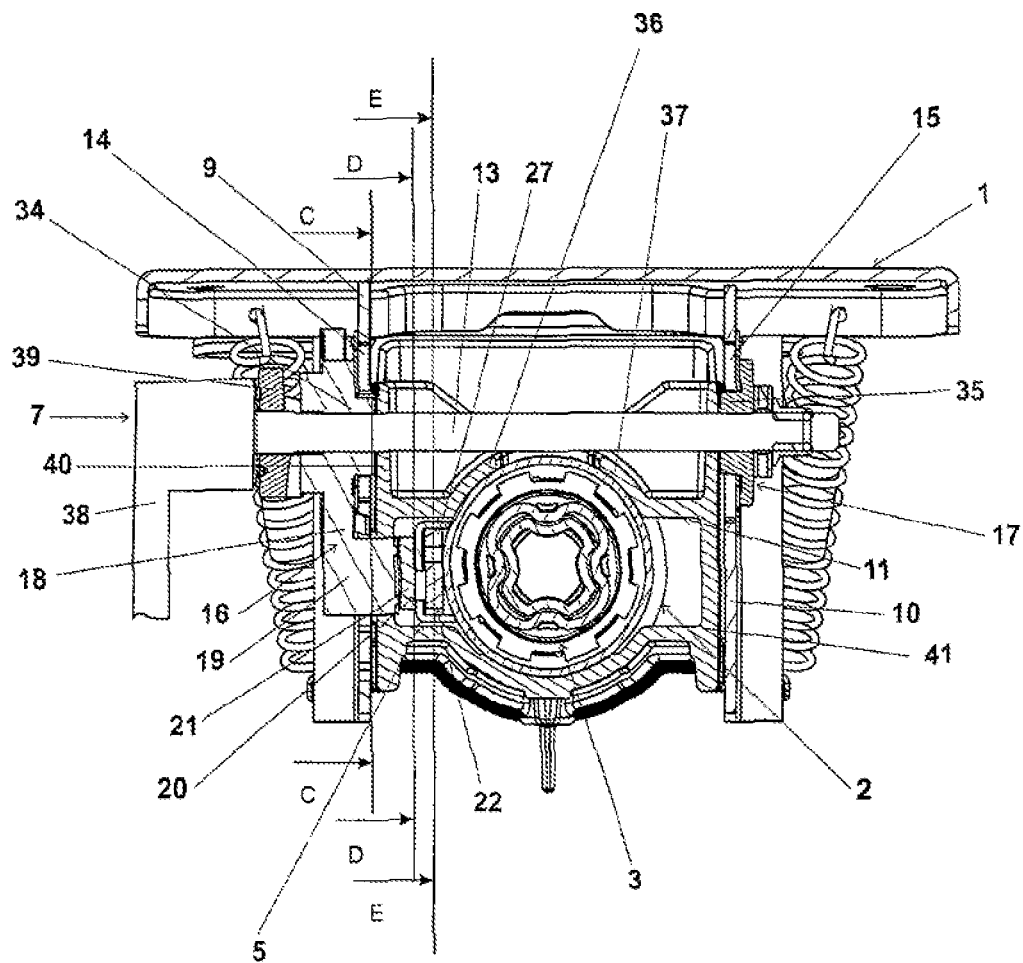
FIG. 4 is a cross section along line BB of FIG. 2.
Figure 5:
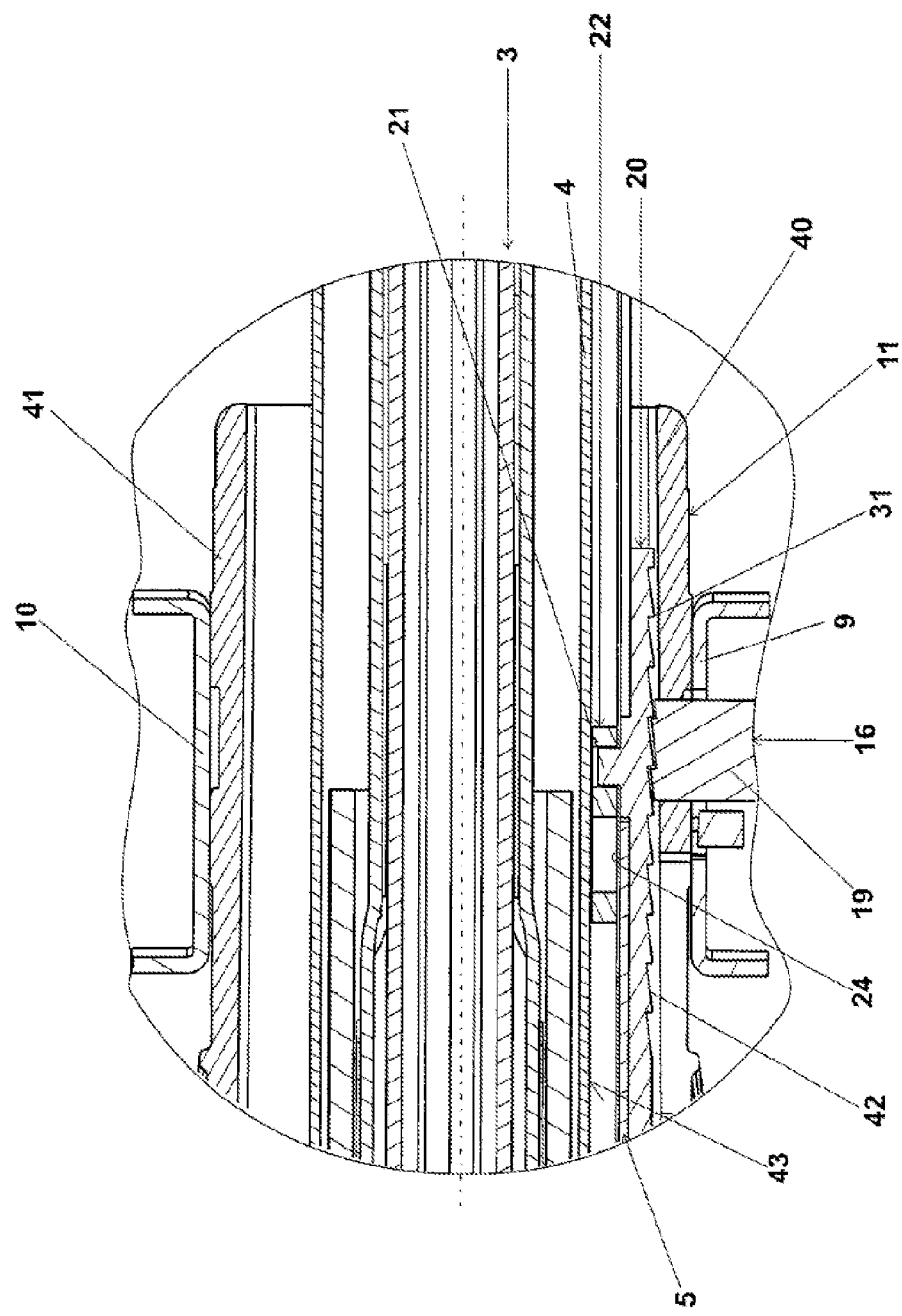
FIG. 5 is a section along line AA of FIG. 2.
Figure 6:
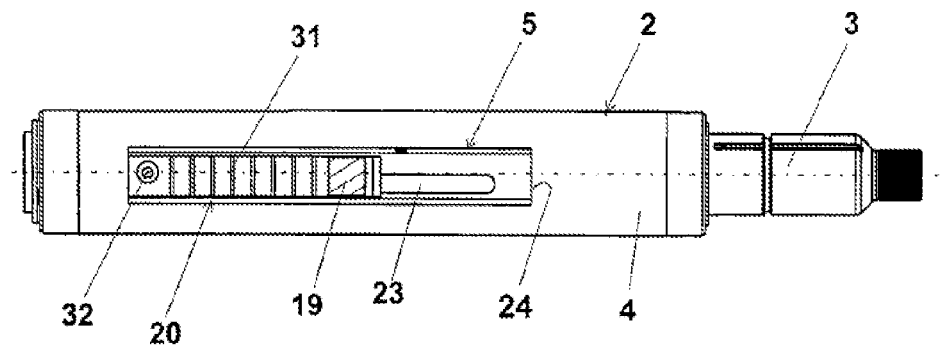
FIG. 6 is a section along line CC of FIG. 4.
Figure 7:
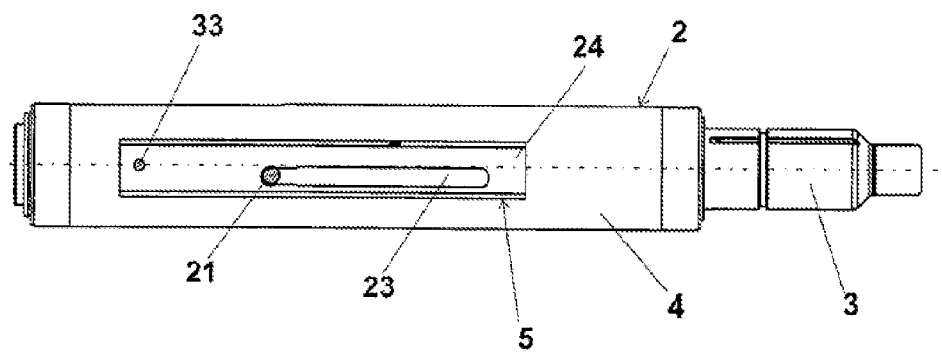
FIG. 7 is a section along line DD of FIG. 4.
Figure 8:
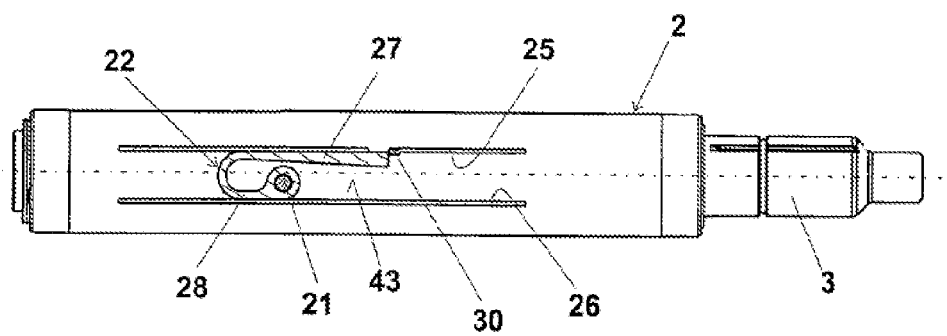
FIG. 8 is a section along line EE of FIG. 4.
Figures 9, 10:
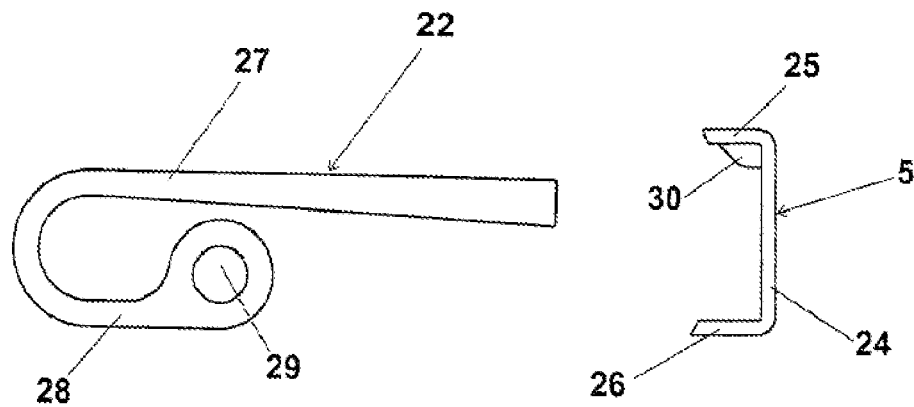
FIG. 9 is a side view of the bending wire or strip.
FIG. 10 is an end-side view of the rail fixed on the jacket tube.
Figures 11, 12:
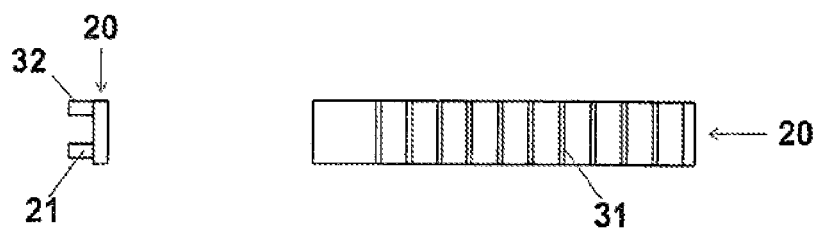
FIGS. 11 and 12 are an end-side view and a side view, respectively, of the engagement element.
Figure 13:
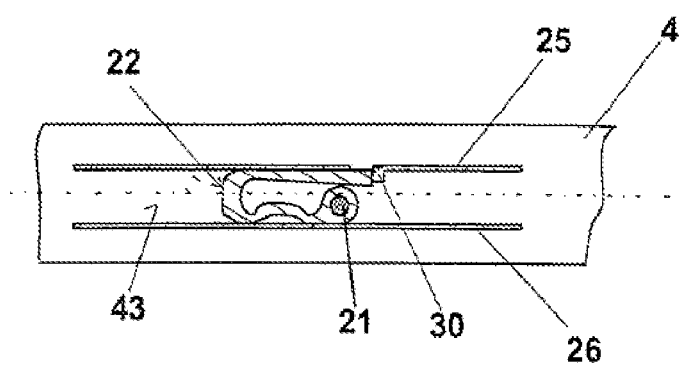
FIG. 13 is a cutaway of a section along line EE of FIG. 4 after a vehicle crash.

An embodiment of a steering column according to the invention is depicted in FIGS. 1 to 13. The steering column comprises a support unit 1, connectable with the chassis of the motor vehicle, and a setting unit 2 which rotatably supports a section of the steering spindle 3 adjoining the steering wheel-side end of the steering column. In the depicted embodiment, the setting unit 2 comprises a jacket tube 4 and a rail 5 rigidly connected therewith, for example by welding, and extending in the longitudinal direction 6 of the steering column or steering spindle 3.

In the opened state of a clamping mechanism 7, the setting unit 2 is adjustable with respect to the support unit 1 in the longitudinal direction 6 of the steering column (=direction of the longitudinal axis of the steering spindle 3) for a length adjustment of the steering column and, in the setting direction 8, for a height or inclination adjustment of the steering column. In the closed state of the clamping mechanism 7, the set position of the setting unit 2 is secured with respect to the support unit 1. Referring to the length adjustment, this securement is maintained as long as the force components, acting in the longitudinal direction of the steering column, of a force acting onto the steering column is below a predetermined limit value (=normal operation). If this limit value is exceeded (=event of a crash), the setting unit 2 is dislocatable in the longitudinal direction 6 of the steering column with respect to the support unit 1 with the absorption of the energy, as will become evident in the following. With proper operation of the steering column, the clamping mechanism 7 is in the closed state in the event of a crash.

In the direction of height or inclination adjustment, in the closed state of the clamping mechanism 7 as high a securement force as possible is raised.

In the depicted embodiment, the setting unit 2 is disposed between side jaws 9, 10 of the support unit 1. Between the side jaws 9, 10 of support unit 1 and setting unit 2 are further located side shanks 40, 41 of an intermediate unit 11 which encompasses the setting unit 2 at least over a large portion of its circumference. In the opened state of the clamping mechanism 7, the intermediate unit 11 is adjustable with respect to the support unit 1 in the setting direction 8 corresponding to the height or inclination adjustment. For this purpose, it is swivellable about a swivel axle 12 with respect to the support unit 1. The intermediate unit 11 is connected, for example (also) via the realization of this swivel axle 12, nondisplaceably with the support unit 1 referred to the longitudinal direction 6 of the steering column. The setting unit 2 is nondisplaceable with respect to the intermediate unit 11 in the setting direction 8, but in the opened state of the clamping mechanism 7 for the length setting of the steering column is displaceable with respect to the intermediate unit 11 in the longitudinal direction 6.

The clamping mechanism 7 comprises a clamp bolt 13 extending transversely to the steering spindle 3, in particular at right angles to the longitudinal direction 6 of the steering column, which bolt penetrates openings 14, 15, realized as elongated holes, in the side jaws 9, 10. The clamp bolt 13 is displaceable in these openings 14, 15 during the height or inclination adjustment of the steering column into the setting direction 8. The clamp bolt 13 is nondisplaceably retained by the margins of these openings 14, 15 in the longitudinal direction 6 with respect to the support unit 1. The clamp bolt 13 further penetrates openings in the side shanks 40, 41 of the intermediate unit 11, whereby it is retained nondisplaceably in the setting direction 8 with respect to the intermediate unit 11. The intermediate unit 11 is thereby also retained nondisplaceably in the longitudinal direction 6 with respect to the support unit 1.

On both sides of the side jaws 9, 10 of support unit 1, arresting parts 16, 17 are disposed on the clamp bolt 13, which parts are penetrated by clamp bolt 13 through openings and are axially displaceable in the direction of the axis of the clamp bolt 13.

The one arresting part 16 includes a section in which it is penetrated by clamp bolt 13 and a section 19, connected therewith via a connection section 18, in which it cooperates with an engagement element 20, as will be described further on.

In the closed state of clamping mechanism 7, the arresting part 17 and the arresting part 16 in the proximity of its section penetrated by clamp bolt 13 are pressed onto side jaws 9, 10 of support unit 1 in order to secure the adjustment of the steering column in setting direction 8. The securement in the adjustment direction 8 can take place by frictional closure. Elements, cooperating under form closure, for example toothings, can also be provided.

Section 19 of arresting part 16 penetrates an opening in side jaw 9 (the side jaw 9 could also terminate above section 19 of arresting part 16) and an opening in the side shank 40 of the intermediate unit 11 and, in the closed state of the clamping mechanism 7, is tightened together with the engagement element 20. Section 19 of arresting part 16, which as a whole is located on one side of clamp bolt 13, is held nondisplaceably against a displacement in the longitudinal direction 6 of the steering column with respect to the support unit 1 by the margins of the penetrated opening in the side jaw 9 and/or by the margins of the penetrated opening in the side shank 40 of the intermediate unit 11.

The engagement element 20 is connected with a bending wire or strip which is located in a housing formed by the rail 5, U-shaped in cross section, in connection with a section of the jacket tube 4. The engagement element 20 for this purpose comprises an entrainer 21 formed by a pin which projects through a slot 23 in the wall 24, removed from the steering spindle 3 and at right angles to clamp bolt 13, of rail 5 forming parts of the housing, which wall represents the base shank connecting the two side shanks 25, 26 of rail 5. The slot 23 extends in the longitudinal direction 6 of the steering column.

Via the entrainer 21 projecting through this slot 23, the engagement element 20, further, is guided displaceably in the longitudinal direction of the setting unit 2 by such unit. The disposition of the entrainer on the bending wire or strip 22 is also conceivable and feasible. The displaceable guidance of the engagement element 20 by the setting unit 2 can also be carried out in a manner different from that described.

The bending wire or strip 22 includes shanks 27, 28 connected via a recurvature of preferably 180°, which shanks extend substantially in the longitudinal direction 6 of the steering column. The two shanks 27, 28 are in contact on opposing sides of the housing, and especially on the inner surfaces of the side shanks 25, 26 of rail 5. The radius of curvature of the bending wire or strip 22 is thereby limited during its deformation, in particular during the progressive bending in the event of a crash.

To connect the engagement element 20 with the bending wire or strip 22, the pin-shaped entrainer 21 in the depicted embodiment projects into a bore 29 in the shank 28. Other connections of the engagement element 20 with the bending wire or strip 22 are conceivable and feasible.

The other shank 27, not connected with the engagement element 20, of the bending wire or strip 22 is stayed on a stop 30 of rail 5 by which it is entrained during a displacement of the setting unit 2 with respect to the support unit 1 in the longitudinal direction 6 of the steering column.

Other connections of the shank 27 with the housing, in which the bending wire or strip 22 is disposed, in order to entrain the shank 27 in the event of a crash in the longitudinal direction 6 of the steering column are conceivable and feasible.

For blocking a displacement of the engagement element 20 in the closed state of the clamping mechanism 7 with respect to the arresting part 16 in the longitudinal direction 6 of the steering column, section 19 of the arresting part 16 includes a toothing 42 in contact on engagement element 20, which toothing cooperates with a toothing 31 of the engagement element. If during the closing of the clamping mechanism 7 these two toothings come to be in contact in a tooth-on-tooth position, a further displacement of the engagement element 20 with respect to the arresting part 16 is blocked at least after a minimal initial displacement (which is smaller than the tooth spacing of the toothing).

Other form-closure connections between the arresting part 16 and the engagement element 20 are also conceivable and feasible, for example via bolts engaging into holes.

A plane intersecting the longitudinal axis (=rotational axis) of the steering spindle 3 and oriented parallel to the clamp bolt 13, intersects the arresting part 16 and engagement element 20 in the proximity of its engagement. In the depicted embodiment, the clamp bolt 13 is located above this plane. Location below this plane is also conceivable and feasible.

During normal operation, the engagement element 20 is held nondisplaceably with respect to the setting unit 2 in the longitudinal direction 6 of the steering column. This can only be effected through the connection of the two parts via the at least one bending wire or strip 22. In the depicted embodiment, additionally a pin 32 is provided which engages into an opening 33 (cf. FIG. 7) of rail 5. If, in the longitudinal direction 6 of the steering column, a force is exerted which exceeds a predeterminable limit value (=event of a crash), the pin 32 is sheared off. Since in normal operation (=if the force acting in the closed state of the clamp mechanism 7 in the longitudinal direction 6 onto the setting unit 2 is zero or below the limit value) the engagement element 20, referring to the longitudinal direction 6 of the steering column, is held nondisplaceably with respect to the setting unit 2, in the closed state of the clamping mechanism 7, through the cooperation of the section 19 of arresting part 16 with the engagement element 20, the securement of the setting unit 2 with respect to the support unit 1 in the longitudinal direction 6 of the steering column is effected. Additional securement elements for securing the length adjustment can be provided. In the depicted embodiment, the section of arresting part 16 penetrated by the clamp bolt 13, and the arresting part 17 include extensions 34, 35, which project through the openings 14, 15 in the side jaws 9, 10 of the support unit 1 and onto which the side shanks 40, 41 of the intermediate unit 11 are pressed. The press-on sections 36, 37 of the intermediate unit 11 are thereby pressed onto the jacket tube 4 and hold it under frictional closure, or also under form closure, against a displacement in the longitudinal direction 6 of the steering column with a holding force (which enters into the limit value for the force component acting in the longitudinal direction of the steering column, above which a displacement of the setting unit 2 with respect to the support unit 1 occurs).

The clamping mechanism 7 can be realized in a conventional manner. For example, a clamp lever 38 for opening and closing the clamping mechanism 7 is connected with a cam disk 39, which the clamp lever 38 entrains during a turning about the axis of the clamp bolt 13 and which cooperates with a crank disk. The crank disk is here realized in one piece with the arresting part 16. A separate crank disk can also be provided. Known arrangements with rolling bodies as clamping systems can also be employed. Other implementations of the clamping mechanism 7 are also conceivable and feasible.

If, starting from its opened state, the clamping mechanism 7 is closed, the arresting parts 16, 17 are displaced in the axial direction of the clamp bolt 13. The securement elements for the height or inclination adjustment come herein into engagement (by pressing the friction faces of the arresting parts 16, 17 onto the friction faces of the side jaws 9, 10). Further, the section 19, in the opened state of the clamping mechanism 7 spaced apart from the engagement element 20, of arresting part 16 is pressed onto the engagement element 20. Furthermore, the optionally provided extensions 34, 35 are pressed onto the intermediate unit 11. The height or inclination adjustment and the length adjustment are thus secured.

If a force exceeding a limit value acts in the longitudinal direction 6 of the steering column (event of a crash), the pin 32 is sheared off and the setting unit 2 is dislocated in the longitudinal direction 6 with respect to the support unit 1 (in a direction pointing toward the vehicle front). As a result, telescopable sections of the steering spindle 2 slide one into the other and the setting unit 2 becomes dislocated with respect to the engagement element 20 held by the arresting part 16 and therefore the bending wire or strip 22 is deformed. This deformation includes in particular the change of the site of the recurvature between the shanks 27, 28. Through this plastic deformation of the bending wire or strip 22, energy is consumed.

In the depicted embodiment, the thickness of shank 27 increases toward its free end, for example in the form of a wedge. Thereby, since the bending wire or strip 22 is confined between the side walls of the housing formed by the side shanks 25, 26, with progressive displacement of the setting unit 2 with respect to the support unit 1, lastly, a ramping-up of section 28 (in the proximity in which it is provided with the bore 29) on the thickening region of shank 27 occurs, whereby additional deformation work through compression occurs.

Through the geometric implementation of the bending wire or strip 22, a desired characteristic for the energy consumption can be attained. For this purpose, the cross section of shank 27 can be realized with a predefined progression over its length with reference to its area and/or with reference to its contour.

Through the encapsulation of the bending wire or strip 22 in a housing, in particular within the rail 5 between wall 24 of the rail 5, the surface 43 of the jacket tube 4 and the two side shanks 25, 26 of rail 5, an especially defined force progression in the event of a crash is settable. The distance between the side shanks 15, 26 of the rail 5, the cross section of the shanks 28 of the bending wire or strip 22, the distance between the surface 43 of jacket tube 4 and the wall 24 of rail 5 can be dimensioned accordingly free of problems via its length and be set with different values.

The shearable pin 32 of the engagement element 20 could also be omitted. The engagement element 20 could also be held in a different manner in a starting position from which it is only dislocatable under increased force, for example so that a pin-shaped entrainer 21 must traverse a nose narrowing the slot 23.

The bending wire or strip 22 could also be realized in a manner different from that described. Two or more bending wires or strips deformed through the cooperation with the engagement element 20 could also be provided.

On both sides of the setting unit 2, energy absorption devices realized in the described manner could also be provided for the longitudinal dislocation of the setting unit 2 in the event of a crash.

Although the implementation with side jaws 9, 10 disposed on both sides of the setting unit 2 is preferred, against which, in the closed state of the clamping mechanism 7, parts of the clamping mechanism are tightened together, implementations are also conceivable and feasible in which the support unit comprises only one side jaws located on one side of the setting unit 2.

In contrast, it is also feasible to provide on both sides of the jacket tube 4 corresponding sections 19, each of which engages into associated engagement elements 20 under form closure. The engagement element cooperates with one associated bending wire or bending strip 22, of which at least one section is entrained by the setting unit 2 during the displacement of the setting unit 2 with respect to the engagement element 20. The particular bending wire or strip 22 is deformed in the displacement of the setting unit 2 with respect to the engagement element 20.

In a further implementation of the invention, for the control of the energy absorption the device is realized so that in the event of a crash, either one, both or none of the bending strips are reformed under control. For this purpose, in a first variant, the two entrainers 21 are realized as pins displaceable in their axial direction, which, if necessary, are brought into engagement or out of engagement with the particular associated bore 29. In a second variant, the section 19 is brought into or out of engagement with the associated engagement element 20, although the clamping mechanism 7 is in the closed state. As the setting unit, pyrotechnical switches and/or other electrically, magnetically, hydraulically or pneumatically acting switches can be employed. The regulation can take place based on information such as, for example: driver buckled in yes/no, weight of driver, distance of driver from the steering column, etc.

The steering column is appropriately realized such that the entrainer 21 or the section 19 of the arresting part 16 is selectively activatable through a control such that at least in the event of a crash, the connection between section 19 of the arresting part 16 and bending wire or strip 22 is optionally established or not established.

Through an additional conventional absorption device, such as is generally known within prior art, a correspondingly lower level of energy absorption can be set.

For the height or inclination adjustment and/or length adjustment, additional cooperating friction faces can also be provided, for example in the form of cooperating lamella, as is known in conventional steering columns.

A steering column according to the invention could, for example, also be realized such that it is adjustable in the longitudinal direction 6. In such an embodiment, the intermediate unit 11 could be omitted and the opening 14, 15 penetrated by clamp bolt 13 could be realized in the form of a circle in each side jaw 9, 10 of the support unit 1.

A steering column adjustable in the longitudinal direction 6, as well as also in the setting direction 8 of the height or inclination, can also be realized without an intermediate unit 11. Herein in the setting unit 2 elongated holes penetrated by clamp bolt 13 could be provided which extend in the longitudinal direction 6 of the steering column. For example, for this purpose on the jacket tube 4, at least one upwardly or downwardly projecting part could be attached in which these elongated holes are disposed.

The support unit 1 could also comprise one subunit stationary on the chassis and one subunit, in the closed state of the clamping mechanism 7, connected with the setting unit 2, which is dislocatable in the longitudinal direction 6 of the steering column with respect to the chassis-stationary subunit in the event of a crash with the absorption of energy, as is known.

It is obvious to a person of skill in the art that the large number of described embodiments of the invention does not represent a conclusive enumeration, and that the features of the discrete embodiments of the invention can be combined with one another.

LEGEND TO THE REFERENCE NUMBERS

1 Support unit
2 Setting unit
3 Steering spindle
4 Jacket tube
5 Rail
6 Longitudinal direction
7 Clamping mechanism
8 Setting direction
9 Side jaw
10 Side jaw
11 Intermediate unit
12 Swivel axle
13 Clamp bolt
14 Opening
15 Opening
16 Arresting part
17 Arresting part
18 Connection section
19 Section
20 Engagement element
21 Entrainer
22 Bending wire or strip
23 Slot
24 Wall
25 Side shank
26 Side shank
27 Shank
28 Shank
29 Bore
30 Stop
31 Toothing
32 Pin
33 Opening
34 Extension
35 Extension
36 Press-on section
37 Press-on section
38 Clamp lever
39 Cam disk
40 Side shank
41 Side shank
42 Toothing
43 Surface

The invention claimed is:

1. A steering column for a motor vehicle, said steering column being adjustable at least in its longitudinal direction and comprising:
   a support unit to be connected with a chassis of the motor vehicle;
   a setting unit rotatably supporting a steering spindle; and
   a clamping mechanism configurable in an opened state, wherein the setting unit is at least displaceable in a longitudinal direction of the steering column with respect to the support unit, and configurable in a closed state, wherein a set position of the setting unit in normal operation is secured with respect to the support unit, the clamping mechanism including an arresting part configured such that, in the closed state of the clamping mechanism, the arresting part is tightened together with an engagement element and such that, in the opened state of the clamping mechanism, the arresting part is spaced apart from the engagement element;
   wherein the setting unit is connected with the engagement element so that the setting unit is held non-displaceably in normal operation in the longitudinal direction of the steering column with respect to the engagement element and, in the event of a crash, is dislocatable with respect to the engagement element in the longitudinal direction of the steering column with the absorption of energy;
   wherein the engagement element cooperates with at least one bending wire or strip having at least one section entrained by the setting unit during the dislocation of the setting unit with respect to the engagement element;
   wherein the bending wire or strip becomes deformed during the dislocation of the setting unit with respect to the engagement element; and
   wherein the bending wire or strip comprises two shanks connected via a recurvature, a first one of the two shanks being fixed on the engagement element.

2. The steering column as claimed in claim 1, wherein a second one of the two shanks of the bending wire or strip is stayed on a stop during the deformation of the bending wire or strip in the event of a crash, the stop being non-displaceable with respect to the setting unit in the longitudinal direction of the steering column.

3. The steering column as claimed in claim 2, wherein the stop comprises a rail.

4. The steering column as claimed in claim 1, wherein the two shanks are connected via a recurvature of 180°.

5. The steering column as claimed in claim 1, wherein the bending wire or strip is at least partially encompassed by a housing.

6. The steering column as claimed in claim 5, wherein the two shanks are arranged such that, starting from a predeterminable distance of the dislocation of the engagement element with respect to the setting unit, upon a further dislocation of the setting unit, the shanks are deformed so that a squeezing of the shanks between sides of the housing occurs.

7. The steering column as claimed in claim 5, wherein the bending wire or strip is connected with the engagement element via an entrainer projecting through a slot in a wall of the housing, the slot extending in the longitudinal direction of the steering column.

8. The steering column as claimed in claim 7, wherein the entrainer or a section of the arresting part is selectively activatable through a control such that, at least in the event of a crash, a connection between the section of the arresting part and the bending wire or strip is optionally established or not established.

9. The steering column as claimed in claim 7, wherein the wall penetrated by the entrainer is formed by a rail fixed on the setting unit so as to be non-displaceable at least in the longitudinal direction of the steering column.

10. The steering column as claimed in claim 1, wherein at least one of the two shanks has a cross section varying along a length of the at least one of the two shanks.

11. The steering column as claimed in claim 1, wherein the engagement element is guided by the setting unit so as to be displaceable in the longitudinal direction of the steering column.

12. The steering column as claimed in claim 1, wherein the arresting part and the engagement element comprise cooperating toothings, the cooperating toothings being configured to counteract a mutual displacement under form closure in the closed state of the clamping mechanism.

13. The steering column as claimed in claim 1, wherein the arresting part is configured so as to be displaced in an axial direction of a clamp bolt of the clamping mechanism with respect to the setting unit during closing of the clamping mechanism.

14. The steering column as claimed in claim 1, wherein the support unit comprises side jaws located on both sides of the setting unit, the side jaws being penetrated by a clamp bolt of the clamping mechanism through openings, and the arresting part penetrating one of the side jaws of the support unit, both of the side jaws of the support unit, and/or a side shank of an intermediate unit through an opening, and being retained by margins in the opening of at least one of the side jaws and the side shank so as to be non-displaceable in the longitudinal direction of the steering column, the intermediate unit being disposed between the side jaws of the support unit and the setting unit.

15. A steering column for a motor vehicle, said steering column being adjustable at least in its longitudinal direction and comprising:
   a support unit to be connected with a chassis of the motor vehicle;
   a setting unit rotatably supporting a steering spindle; and
   a clamping mechanism configurable in an opened state, wherein the setting unit is at least displaceable in a longitudinal direction of the steering column with respect to the support unit, and configurable in a closed state, wherein a set position of the setting unit in normal operation is secured with respect to the support unit, the clamping mechanism including an arresting part configured such that, in the closed state of the clamping mechanism, the arresting part is tightened together with an engagement element and such that, in the opened state of the clamping mechanism, the arresting part is spaced apart from the engagement element;
   wherein the setting unit is connected with the engagement element so that the setting unit is held non-displaceably in normal operation in the longitudinal direction of the steering column with respect to the engagement element and, in the event of a crash, is dislocatable with respect to the engagement element in the longitudinal direction of the steering column with the absorption of energy;
   wherein the engagement element cooperates with at least one bending wire or strip having at least one section entrained by the setting unit during the dislocation of the setting unit with respect to the engagement element;
   wherein the bending wire or strip becomes deformed during the dislocation of the setting unit with respect to the engagement element, and the bending wire or strip is at least partially encompassed by a housing; and
   wherein the bending wire or strip comprises two shanks arranged such that, starting from a predeterminable distance of the dislocation of the engagement element with respect to the setting unit, upon a further dislocation of the setting unit, the shanks are deformed so that a squeezing of the shanks between sides of the housing occurs.

16. A steering column for a motor vehicle, said steering column being adjustable at least in its longitudinal direction and comprising:
   a support unit to be connected with a chassis of the motor vehicle;
   a setting unit rotatably supporting a steering spindle; and
   a clamping mechanism configurable in an opened state, wherein the setting unit is at least displaceable in a longitudinal direction of the steering column with respect to the support unit, and configurable in a closed state, wherein a set position of the setting unit in normal operation is secured with respect to the support unit, the clamping mechanism including an arresting part configured such that, in the closed state of the clamping mechanism, the arresting part is tightened together with an engagement element and such that, in the opened state of the clamping mechanism, the arresting part is spaced apart from the engagement element;
   wherein the setting unit is connected with the engagement element so that the setting unit is held non-displaceably in normal operation in the longitudinal direction of the steering column with respect to the engagement element and, in the event of a crash, is dislocatable with respect to the engagement element in the longitudinal direction of the steering column with the absorption of energy;
   wherein the engagement element cooperates with at least one bending wire or strip having at least one section entrained by the setting unit during the dislocation of the setting unit with respect to the engagement element;
   wherein the bending wire or strip becomes deformed during the dislocation of the setting unit with respect to the engagement element; and
   wherein the bending wire or strip comprises two shanks, at least one of the two shanks having a cross section varying along a length of the at least one of the two shanks.

* * * * *